United States Patent Office 3,565,950
Patented Feb. 23, 1971

3,565,950
METHOD OF PURIFYING CRYSTALS OF
L-GLUTAMIC ACID
Kenkichi Ito, Kanagawa-ken, Naomasa Mizoguchi, Tokyo, and Miyoji Dazai, Kotaro Fujiwara, and Yoshiki Sakata, Kanagawa-ken, Japan, assignors to Ajinomoto Co., Inc., Tokyo, Japan
No Drawing. Filed Oct. 25, 1966, Ser. No. 589,194
Claims priority, application Japan, Oct. 26, 1965, 40/65,638
Int. Cl. C07c 99/12
U.S. Cl. 260—527    3 Claims

ABSTRACT OF THE DISCLOSURE

If L-glutamic acid crystals, of which at least 40% are in the alpha form, are heated to a temperature of 50° C. or higher in a medium mainly consisting of water insufficient to dissolve the crystals entirely and at least 30% of the initially present α-form is converted to the β-form, the resulting crystals are rod-shaped, easy to filter and to wash free from mother liquor. The crystals may be entirely converted to the rod-shaped β-type.

This invention relates to the purification of glutamic acid, and particularly to the purification of crude crystals of L-glutamic acid.

The acid is being manufactured industrially on a large scale as an intermediate for conversion to monosodium glutamate, which is a seasoning, and for the manufacture of polyamide fibers. Four processes account at this time for most industrially manufactured L-glutamic acid, and these known processes will be described briefly in the order in which they were introduced to the chemical industry.

(1) Proteins rich in L-glutamic acid, such as wheat gluten, soy bean meal, corn gluten, corn meal, and cotton seed meal are hydrolyzed in the presence of mineral acids, such as hydrochloric acid or sulfuric acid, and crude L-glutamic acid is separated from the hydrolyzate.

(2) Precursor compounds of glutamic acid are present in by-products and wastes of the beet sugar industry, and are extracted therefrom, sometimes after a preliminary treatment with mineral acid, and hydrolyzed. L-glutamic acid is recovered from the hydrolyzate.

(3) L-glutamic acid is formed by many microorganisms when cultured on aqueous media which provide the necessary carbon and nitrogen. L-glutamic acid is separated from the fermentation broth obtained.

(4) The synthesis of L-glutamic acid employs beta-formylpropionic acid and its esters, and beta-cyanopropionaldehyde as starting materials which are subjected to Strecker's or Bucherer hydantoin synthesis. The synthetic DL-glutamic acid is optically resolved, for example, by seeding a supersaturated solution with the desired enantiomorph.

The crude crystals of L-glutamic acid initially recovered from the reaction mixtures or fermentation broths of the four processes outlined above cannot be processed further without purification. It has been common practice heretofore to dissolve the crude crystals, to treat the solution obtained with a decolorizing agent, such as active carbon, to remove the carbon by filtration, and to crystallize the purified acid from the filtrate after the same has been made supersaturated. The known purification process and the various conventional modfications thereof require substantial amounts of thermal energy, of water of good quality, and of chemicals. The ultimate crystallization calls for high skill on the part of the operators or their supervisors to achieve a crystal crop having desirable properties.

L-glutamic acid crystallizes in two forms differing in their X-ray diffraction patterns and in their solubilities. Both forms are rhombic, but the crystals of the alpha-form have the shape of short rods whereas those of the beta-form normally have the shape of needles or the plates. The betaform is stable at ordinary temperature, and the alpha-form converts spontaneously to the beta-form in the presence of water, the conversion being quite rapid above 30° C. Crystals of the alpha-form, because of their more favorable weight-to-surface ratio, retain less mother liquor during centrifuging or filtration than the known beta-crystals under otherwise similar conditions. Unless the crystallization of glutamic acid from its supersaturated solutions is performed skilfully, the initially formed, desirable alpha-crystals are converted to the beta-crystals.

We now have found that crude crystals of L-glutamic acid prepared by any one of the four processes outlined above can be purified without completely dissolving them, without the use of decolorizing agents, and without filtration. The resulting product consists entirely or predominantly of L-glutamic acid crystals in the beta-form. However, the beta-crystals, when prepared by our method, have the desired properties heretofore associated exclusively with the alpha-form. They lack the tendency of conventional beta-crystals to retain relatively large amounts of mother liquor and, therefore, are much purer than would be expected from their X-ray diffraction pattern and their solubility, which are identical with the corresponding properties of the needle-like and scaly beta-crystals known heretofore.

The impurities present in L-glutamic acid prepared industrially by the afore-mentioned processes consist mainly of coloring matter, nitrogenous condensation products of carbohydrates, amino acids other than L-glutamic acid, and lower peptides. Within most of these broad classes, there is a wide range of compounds of high molecular weight whose chemical structure defies attempts at precise identification.

We have found that all these impurities regardless of their precise chemical nature, have properties in common which permit them to be separated from the accompanying L-glutamic acid under specific, critically important conditions in a simple manner. The crystals of L-glutamic acid obtained by the purification process of the invention are of the beta-type. Yet, their purity is not inferior to the best alpha-type crystals obtained by recrystallization, and they can be separated easily from the mother liquor by filtration. The method of the invention is simple and practically foolproof.

The basic feature of our invention resides in contacting the crude crystals of L-glutamic acid with water above 50° C. in an amount too small to dissolve the crystals until the solid phase reaches the desired purity. The crystals may then be separated from the mother liquor which retains the impurities. The reduction in the amount of coloring matter in the crystals is particularly striking.

The coloring matter present in glutamic acid derived from natural sources by hydrolysis of peptides or by fermentation consists mainly of amphoteric compounds of high molecular weight, in which repeating radicals of carbohydrates (glucose, sucrose) or polyhydric alcohols (mannitol) can be found, or which are proteins or their decomposition products (peptides, sometimes accompanied by amino acids and ammonia). The compounds are formed or precipitated by the treatment of a raw material with a strong acid. Synthetic L-glutamic acid prepared by Strecker's reaction contains the products of polymerization or condensation of hydrogen cyanide, and may further contain products of reaction with ammonia or aldehydes. All these compounds, and others of which even less is known, and which are admixed to the crude glutamic acid obtained from the four industrial processes described above, are removed from the crude glutamic acid crystals by the method of this invention until the residual amounts either are not objectionable or can be removed in simple secondary treatments where highest purity is required.

It is necessary that the crude crystals which are the starting material of this invention consist at least in part of alpha crystals. This requirement is readily met since glutamic acid crystallizes in the alpha form as long as it contains appreciable amounts of impurities. The problem of preventing conversion of the initially crystallized alpha-form to the beta-form does not become difficult until the crystals reach relatively high purity.

The water in contact with the crude crystals dissolves some of the crystalline material, and the outcome is not affected if the water initially contains glutamic acid. Except as will be discussed hereinafter in more detail, the pH of the aqueous medium also has no effect on the purification of the crude glutamic acid crystals as long as glutamic acid is stable as a solid phase in contact with the medium. The medium may contain acids and bases whose salts or addition compounds with glutamic acid are soluble at the prevailing pH. The aqueous medium thus may consist of water or of aqueous solutions of glutamic acid, its alkali metal, alkaline earth metal, and ammonium salts, and of its soluble addition compounds with mineral acids.

As far as is known at this time, the method of the invention is applicable only to crude glutamic acid prepared by the four industrial processes outlined above. It does not result in removal of impurties from glutamic acid crystals prepared in a known manner by optical resolution of a racemate obtained from cyclopentadiene by way of alpha-chloroglutaric acid, or from furfural by way of furancarboxlic acid and alpha-ketoglutaric acid. The natural product obtained by extraction of seaweeds, such as sea tangle, does not lend itself to purification by our method.

The precise quantitative relationship of alpha- and beta-type crystals in the starting material of the invention is not critical. The method achieves the same results with crysals which are all in the alpha form, and with crystals in which the beta-form predominates and the alpha-crystals are only a small fraction of the total, as little as about 40 percent being sufficient.

The aqueous medium may originally consist entirely of water or it may contain the various salts and additional compounds of glutamic acid, the sodium, potassium, ammonium, and calcium salts being commonly available as well as the hydrochloride of glutamic acid. The amount of the aqueous medium must be smaller than would be required to dissolve the crude crystals completely. The amount of liquid medium may be selected to suit specific operating conditions. As a general rule, the amount of liquid should be increased with increasing contamination of the glutamic acid crystals. Still, the amount of liquid employed should be held to a minimum consistent with the results to be achieved to avoid the unnecessarily handling of large amounts of inert material. We prefer to provide good contact of the crude crystals with the liquid medium by stirring, and the resistance of the resulting slurry to movement of the agitator is another factor to be considered in selecting the ratio of the liquid and of the crystals.

The temperature of the liquid medium must be at least 50° C. and the upper temperature limit is set by the boiling point of the slurry at the prevailing pressure. Agitation is desirable but not necessary. The time of contact between the liquid medium and the crystals is determined by the desired result. It is obviously useless to continue treatment when samples taken at an interval do not show further improvment. As will presently be shown, the conversion of the alpha-type crystals originally present to beta-type is a reliable measure of the progress of the purification treatment. It is advantageous to terminate the treatment when at least 30% of the originally present alpha-type crystals have been converted to the beta-type.

Significant purification is not achieved at temperatures lower than 50° C., and the yield of pure L-glutamic acid crystals drops sharply at temperatures higher than the boiling point of the aqueous medium because of conversion of L-glutamic acid to pyrrolidonecarboxylic acid and because of thermal racemization.

Table 1 lists relevant data and results of trial runs for determining the relationship between the temperature of the aqueous medium and the amount of mother liquor retained on the purified crystals, the conversion of alpha-type crystals into beta-type crystals, the distribution of particle size in the purified crystals, and the residual coloring matter in the purified crystals.

The crude crystals employed were yellowish-brown and contained 97% alpha-form crystals as determined by X-ray diffraction. They were recovered from a fermentation broth in which a suitable strain of Brevibacterium had been cultured for 50 hours, and whose primary carbon source was cane molasses obtained from Mindanao in the Philippines. The broth was first treated with concentrated hydrochloric acid, and its pH had then been adjusted to 3.2 to precipitate the glutamic acid.

A slurry prepared from 300 g. of the crude crystals and 700 ml. pure water was held at the temperatures listed for three hours and was stirred with an agitator running at 60 r.p.m. The pH was held at 3.2. At the end of the three hour period, the slurry was cooled quickly to room temperature, and the crystals were separated from most of the mother liquor under uniform conditions on a centrifugal separator rotating at 2,000 r.p.m.

The cake of crystals was removed from the centrifuge basket and was broken up to separate the agglomerated crystals without breaking individual crystals. The treated crystals were then mixed, and a sample of approximately 100 g. was taken. The sample was spread in a layer of uniform thickness in a petri dish of 9 cm. diameter and dried at 110° C. and 10 mm. Hg for 8 hours. The moisture content of the centrifuged material was determined from the difference in weight before and after drying as a measure of the mother liquor retained in centrifuging.

The percentage of the original alpha-form crystals that was converted to the beta form by the purification treatment was determined by X-ray diffraction of a dry purified sample.

The distribution of particle size in the purified material was determined by means of ASTM standard sieves on a 100 g. sample while wet with ethanol. The several fractions were weighed when dry.

The glutamic acid content of the crude and purified crystals was determined by means of a Warburg manometer using L-glutamic acid dehydrogenase extracted from a pumpkin. The values obtained formed the basis for the calculation of the rate at which the glutamic acid present in the crude crystals was recovered in the centrifuged material.

Coloration was determined by measuring the absorbency of solutions prepared by dissolving a 0.5 g. sample of dried material in pure water to make 100 ml. A 10 mm. cell and light of 400 mμ. were used. The original absorbency was used as a base for calculating percent absorbency of the treated crystalline material.

TABLE 1

| Temperature | 30 | 40 | 50 | 60 | 80 | 100 | 120 |
|---|---|---|---|---|---|---|---|
| Moisture, percent | 32.5 | 25.1 | 18.0 | 15.0 | 12.0 | 10.9 | 11.2 |
| Beta-conversion, percent | 36 | 59 | 78 | 85 | 95 | 100 | 100 |
| Crystal size, percent: | | | | | | | |
| −35 | 5 | 5 | 7 | 8 | 10 | 13 | 15 |
| 35−70 | 11 | 18 | 44 | 48 | 52 | 55 | 53 |
| 70−140 | 48 | 42 | 28 | 24 | 24 | 22 | 21 |
| 140−270 | 22 | 21 | 15 | 15 | 10 | 8 | 9 |
| 270− | 14 | 14 | 6 | 5 | 4 | 2 | 2 |
| Recovery, percent | 94.2 | 94.0 | 94.1 | 93.8 | 93.8 | 91.0 | 72.7 |
| Coloration, percent | 83.9 | 76.7 | 14.8 | 11.5 | 8.7 | 8.0 | 7.7 |

As is evident from the table, a temperature variation between 50° and 100° C. has very little effect on the results achieved, such as retention of mother liquor by the crystals in centrifuging under standardized condition, distribution of particle size, and recovery rate. At 30° and 40° C., the conversion rate is significantly lower and the particle size distribution is shifted toward the smaller sizes which retain more mother liquor and are more difficult to filter. Most of the coloring matter is retained in the crystals treated at less than 50° C. When the treatment temperature is 120° C., there is a significant loss in recovered material due to conversion of the glutamic acid to pyrrolidonecarboxylic acid. Other results are not unfavorably affected by the higher temperature.

The temperature which produces the most favorable combination of results within the range from 50° C. to boiling must be determined experimentally for each set of conditions. The best temperature is generally somewhat lower for crude crystals synthesized by the Strecker reaction than for crystals derived from sources in nature and containing other amino acids, such as tyrosine, leucine, cystine, and phenylalanine, peptides or proteins, and surface active materials, such as saponins.

The influence of the treating time on retained moisture, beta conversion, and coloration is illustrated by the results of trial runs at 95° C., listed in Table 2. The same starting material was employed as in the tests to which Table 1 applies.

TABLE 2

| Treating time, minutes | 15 | 27 | 32 | 38 | 43 | 45 |
|---|---|---|---|---|---|---|
| Moisture, percent | 27.1 | 28.3 | 18.1 | 13.9 | 14.2 | 12.5 |
| Beta conversion, percent | 10 | 20 | 30 | 50 | 80 | 100 |
| Coloration, percent | 80.3 | 39.9 | 15.2 | 13.8 | 12.1 | 8.9 |

It is evident from Table 2 that most of the improvement is achieved as soon as 30% of the alpha-form crystals have been converted to the beta-form. Improvement thereafter is relatively slow. More than 80% in the reduction of retained moisture is achieved during the period necessary for converting 30% of the alpha-crystals to the beta-form, and little is gained in this respect by continuing the treatment.

The origin of the crude L-glutamic acid crystals is relatively unimportant as long as they come from the four processes referred to above. Variations of process conditions within the individual processes have not been found to have detectable effects on the results achieved by the purification method of this invention. More specifically, the nature of the microorganisms and the composition of the culture medium in which they are cultured in the fermentation method appears not to be of any consequence as far as the instant invention is concerned.

No differences relevant to the effectiveness of our purification method result from different methods employed in crystallizing the crude material, such as evaporation of water from a solution not initially supersaturated with L-glutamic acid, pH adjustment, cooling, or any combination of such methods.

Table 3 lists representative results achieved with crude glutamic acid crystals prepared by widely differing methods from dissimilar raw materials.

Sample A was prepared from soy beans grown in the United States, which were shelled, defatted with a solvent mainly consisting of n-hexane, and then hydrolyzed with concentrated hydrochloric acid at elevated pressure. L-glutamic acid was recovered from the hydrolyzation mixture as impure glutamic acid hydrochloride which was dissolved in aqueous ammonia. Crude L-glutamic acid was crystallized from the solution when its pH was adjusted to 3.2.

Sample B was prepared from vinasse obtained from a French sugar mill. The vinasse was adjusted to pH 1 and was then extracted with butanol saturated with water. The extract was evaporated to remove the butanol. The residue mainly consisted of pyrrolidone-2-carboxylic acid and was hydrolyzed with sodium hydroxide. Crude L-glutamic acid was crystallized from the hydrolyzate, as in the preparation of Sample A.

Sample C-1 was the crude L-glutamic acid described with reference to Table 1.

Sample C-2 was prepared by adding a zinc salt to the fermentation broth described with reference to Table 1, whereby zinc glutamate was precipitated. The zinc glutamate was decomposed by means of sodium hydroxide, the zinc was precipitated from the solution obtained as the hydroxide, and crude glutamic acid was precipitated by adjusting the pH to 3.2.

Sample D was prepared by reacting acrylonitrile, hydrogen and carbon monoxide in the presence of cobalt carbonyl, further reacting the beta-cyanopropionaldehyde so obtained with hydrogen cyanide and ammonia, whereby alpha-aminoglutaronitrile was formed. The last-mentioned compound was hydrolyzed to DL-glutamic acid by the method of U.S. Patent No. 3,010,994, and the racemate was optically resolved according to the method of U.S. Patent No. 2,940,998 by seeding its supersaturated solution with crystals of L-glutamic acid.

Table 3 lists data and results in the manner of Table 1. The percentage of alpha-form crystals in the crude material is also listed for each sample.

TABLE 3

| Sample | A | B | C-1 | C-2 | D |
|---|---|---|---|---|---|
| Alpha-form, percent | 100 | 80 | 97 | 90 | 95 |
| Treatment time, hours | 1.5 | 1.0 | 0.75 | 2.0 | 1.0 |
| Treatment temp., ° C | 100 | 95 | 90 | 70 | 50 |
| Moisture, percent | 16.2 | 17.8 | 12.8 | 12.4 | 11.8 |
| Beta-conversion, percent | 88 | 100 | 95 | 100 | 100 |
| Recovery, percent | 90.2 | 91.0 | 92.3 | 89.9 | 91.2 |
| Coloration, percent | 11.0 | 16.9 | 8.3 | 7.0 | 18.0 |

As is seen from Table 3, more than 80% of the coloring matter can be removed by the method of this invention from crude glutamic acid produced by different methods in a very short time and in a very simple manner.

The pH of the aqueous medium with which the crude crystals are being contacted affects the results achieved to some extent. If the slurry of crude crystals and liquid medium has a pH of 3.2, corresponding to the isoelectric point of glutamic acid, the recovery of glutamic acid reaches its maximum value. If the impurities to be removed are amphoteric and are least soluble in the same pH range, better purification is achieved at other pH values at some initial sacrifice in recovery.

Table 4 lists results achieved with the slurry referred to above with reference to Table 1 when its pH was adjusted to various values by means of sodium hydroxide. The purification temperature was 80° C., and the time of contact was one hour.

TABLE 4

| pH | 1.0 | 2.0 | 3.2 | 4.0 | 5.0 |
|---|---|---|---|---|---|
| Recovery, percent | 9.2 | 14.5 | 18.2 | 11.1 | 5.9 |
| Coloration, percent | 78.3 | 88.5 | 94.9 | 85.1 | 76.2 |

Selection of an appropriate pH value for the aqueous liquid brought into contact with the crude glutamic acid crystals thus permits a further refinement of the method which is basically effective at all pH values of the liquid at which L-glutamic acid is stable as a solid phase in contact with the liquid. The glutamic acid values remaining in the mother liquor may be recovered by using the same liquor as a purifying agent for the next batch of crude glutamic acid crystals. This process may be repeated several times, and the heavily contaminated small volume of liquid may then be purified by treatment with activated carbon and returned to the process. An overall recovery of almost 100% is thus possible even when operating at a pH different from 3.2.

We have found that the beta-form crystals produced by our method accelerate the conversion of crude alpha-type crystals and their purification by our method. The time required for complete beta-conversion of alpha-type crystals is directly related to the amount of beta-form crystals of this invention which are present in the slurry during the treatment.

A slurry of Sample C-1 and water was prepared as described with reference to Table 1, and the amounts of beta-form material listed in Table 5 in percent of the alpha-form crystals of Sample C-1 were mixed with the slurry. The time required for complete conversion of all alpha-form crystals at 50° C. is also indicated in Table 5. The completeness of conversion was observed visually under a microscope in all cases.

TABLE 5

| Added beta-form crystals, percent | 0 | 5 | 10 | 20 | 30 |
|---|---|---|---|---|---|
| Time to 100% conversion, minutes | 90 | 57 | 33 | 24 | 15 |

When the method of this invention is carried out at temperatures near the upper limit of the recommended range, say, at 95° C., a small amount of glutamic acid is converted to pyrrolidonecarboxylic acid. This amount is substantially smaller than the amount converted to pyrrolidonecarboxylic acid when glutamic acid is recrystallized from solutions which are heated to the same temperature. The difference is believed to be due to the fact that, most of the glutamic acid is present in the slurry of our process as a solid and is thereby protected against conversion to pyrrolidonecarboxylic acid, which takes place in the liquid phase only.

The L-glutamic acid crystals purified according to this invention are readily separated from the mother liquor which retains the impurities. The improved properties of the beta-form crystals obtained by the method of the invention are equally beneficial whether the separation of crystals and mother liquor is performed by simple decantation, by centrifuging, or by pressure or vacuum filtration. The separation should be carried out promptly after completion of the treatment.

Manifold advantages are achieved by the instant method over conventional methods of purifying crude glutamic acid crystals. The amount of material to be handled during purification is sharply reduced, and the cost of the equipment required for purifying a certain amount of crystals is correspondingly lower. The process of this invention can be carried out with the consumption of a significantly smaller amount of thermal and other energy than the recrystallization processes heretofore practiced. The method of the invention normally does not require the use of any chemicals nor of decolorizing agents. The method is very rapid, and even a small plant can purify glutamic acid at a high rate. A second purification step is necessary only when unusually severe requirements have to be met, but such a second step can be performed at a low cost because most of the undesired coloring matter and other impurites are removed in the process of this invention.

The recovery rate is excellent, and the losses due to formation of pyrrolidonecarboxylic acid are particularly low. The method can be carried out by an operator without special skills, and the amount of labor required per unit of pure crystals produced is small.

The following examples further illustrate this invention, but it should be understood that the invention is not limited thereto.

EXAMPLE 1

A fermentation broth was obtained by culturing a suitable strain of Brevibacterium on a medium whose principal carbon source was a starch hydrolyzate prepared from sweet potatoes by means of sulfuric acid and subsequent neutralization and filtration. Glutamic acid was precipitated from the broth as crude crystals of the granular alpha form after a treatment with concentrated hydrochloric acid and pH adjustment by the method of U.S. Pat. No. 3,029,280.

A slurry having a volume of 1440 ml. was prepared from 500 g. of the crude glutamic acid crystals and 1100 ml. pure water. The slurry was stirred at 95° C. for 30 minutes, whereby the crystals were converted into the rod shaped beta form characteristic of the crystals produced by our method. The slurry was cooled to 40° C., and was then left standing until the crystals settled. The supernatant mother liquor containing suspended impuries was decanted. The residue was wrapped in unbleached muslin, and as much as possible of the adhering mother liquor was squeezed out by hand. The crystals were then washed with a small amount of cold water and dried at 10 mm. Hg and 50° C. for 8 hours. They weighed 428 g.

The specific rotatory power and total nitrogen content of a sample solution of the purified material was compared with corresponding measurements on a sample of chemically pure glutamic acid. The purity of the material obtained by the method of the invention was 99.4% percent. The recovery was 89.5%.

Another sample of the purified crystals was dissolved in a sufficient amount of sodium hydroxide solution to make a sodium glutamate solution of pH 7.0 and specific gravity 1.21. The solution was filtered through paper and its absorbency for light or wavelength 400 mμ. was measured as "residual coloration." This was found to be 1.28.

When the sodium glutamate solution was stirred at room temperature for 10 minutes with 0.1% by weight of active carbon prior to filtering, the residual coloration was 0.033.

By way of comparison, 500 g. crude crystals obtained from the same fermentation broth were dissolved by heating in 4,500 ml. water. The hot solution was filtered, and the filtrate was gradually cooled. Crystallization began at 73.5° C., and the temperature thereafter dropped to 40° C. over a period of three hours. The crystals were filtered from the mother liquor, and dried as described above. They weighed 374 g. and had the shape of thin plates or scales. The purity of the crystals was only 97.5%, their residual coloration 2.57, the recovery 77.7%. Carbon treatment improved the residual coloration to 0.092.

In yet another comparison test, 500 g. of the crude crystals were dissolved in a solution of 56 g. sodium hydroxide per liter to form a neutral sodium glutamate solution which was then filtered and gradually adjusted to pH 3.2 by the addition of concentrated hydrochloric acid. The crystals precipitated were separated from adhering mother liquor and dried as described above. They weighed 425 g. when dry, their purity was only 97.1%, recovery was 87.0%, their residual coloration 4.74, and 0.172 after carbon treatment.

EXAMPLE 2

Gluten from spring sown Manitoba wheat was hydrolyzed by means of concentrated hydrochloric acid, and enough additional hydrochloric acid was added to the hydrolyzate to precipitate crystals of L-glutamic acid hydrochloride. The recovered crystals were dissolved, and the aqueous solution was adjusted to pH 3.2 with aqueous ammonia to crystallize L-glutamic acid.

One liter of an aqueous monosodium glutamate solution was prepared from 100 g. of the crude crystals and an equivalent amount of sodium hydroxide and had a pH of 6.5. The glutamate solution was kept in contact with an additional amount of 380 g. of the crude glutamic acid crystals at 90° C. for one hour, whereby the spindle-shaped alpha-form crystals originally present were transformed into the rod-shaped beta-form crystals.

The slurry was cooled to 30° C., and the mother liquor was removed by filtration. The crystals were washed with a small amount of cold water and dried at 10 mm. Hg and 50° C. for 8 hours. The purified crystals weighed 352 g., had a purity of 99.8% and a residual coloration of 0.51.

EXAMPLE 3

100 g. crude glutamic acid crystals prepared as in Example 2 were mixed with hydrochloric acid to prepare one liter of an aqueous L-glutamic acid hydrochloride solution of pH 1. The solution was held in contact with additional 380 g. of crude crystals at 90° C. for one hour, whereupon the slurry was cooled to 30° C. and filtered. The crystals, when washed and dried, weighed 343 g., had a purity of 99.5%, and a residual coloration of 0.72.

EXAMPLE 4

Another 380 g. of the crude L-glutamic acid crystals of Example 2 were held in contact with one liter of pure water at 90° C. for one hour, whereupon the slurry was cooled at 30° C. and filtered. The crystals, when washed and dried, weighed 341 g., had a purity of 99.4%, and a residual coloration of 1.18.

A comparison test was performed on 390 g. of the same crude crystals which were dissolved in 4500 ml. of pure water at 90° C. by stirring for 30 minutes. The solution was slowly cooled to 30° C., and the resulting crystals were filtered and dried as described in Example 2. They weighed 305 g., had a purity of 97.8% and a residual coloration of 2.35, results which are inferior to those produced by the method of the invention on the same raw material in Examples 2, 3, and 4.

EXAMPLE 5

A saturated aqueous solution of zinc sulfate was added to a fermentation broth on which a strain of Brevibacterium had been cultured, the principal carbon source being molasses from Philippine sugar cane. The precipitated crystals of zinc glutamate were separated from the mother liquor by centrifuging, and decomposed by contact with an aqueous solution of hydrochloric acid whose pH was maintained at 3.2. Crude glutamic acid crystals were thereby obtained. Their purity was 96% on a dry basis.

Live steam was blown into a slurry prepared from 5 kg. of the crystals and 11.2 liters tap water at a rate sufficient to keep the temperature of the mixture at 55° C. for 50 minutes, whereupon the alpha-type crystals originally present were converted to the beta type. The slurry was then cooled to 20° C. over a period of 3 hours, and the liquid was partly removed by centrifuging. The residue was mixed with twice its volume of cold water, stirred, and centrifuged again. The crystals were then dried in a vacuum.

They weighed 4.8 kg., had a purity of 99.3% and a residual coloration of 1.93. The recovery was 92%. Carbon treatment in the manner described in Example 1 reduced the coloration to 0.02. The residual coloration of the crude crystals when determined in the same manner was 8.80, and was reduced to 2.58 by carbon treatment.

EXAMPLE 6

Crude glutamic acid crystals were obtained from soy beans in the manner described above with reference to Sample A. A 50 g. sample was dissolved in aqueous sodium hydroxide to produce 2 liters of a neutral monosodium glutamate solution. The solution was poured over 950 g. of the same crue glutamic acid crystals, and the slurry was heated to 70° C. by means of direct steam. 100 g. purified beta-form crystals obtained by the method of Example 1 were added, and a temperature of 70° C. was maintained for about one hour, whereby all the alpha-form crystals originally present were converted to the beta type. The slurry was cooled to 15° C. within one hour and centrifuged. The dry crystals ultimately obtained had a purity of 99.2%, a glutamic acid content of 810 g., and a residual coloration of 1.51. The recovery was 90.1%. Carbon treatment reduced the coloration to 0.062.

The residual coloration of the crude crystals, when determined prior to and after carbon treatment had values of 9.98 and 2.93.

EXAMPLE 7

Vinasse obtained from a French sugar factory was adjusted to pH 1 with concentrated sulfuric acid, and pyrrolidonecarboxylic acid was extracted with n-butanol. The solvent was removed from the extract by distillation, and the residue was hydrolyzed by means of hot sodium hydroxide sholution. When the hydrolysis mixture was adjusted to pH 5.0 with hydrochloric acid, huminous substances and neutral amino acids were precipitated and removed by filtration. The filtrate was adjusted to pH 3.2, and L-glutamic acid was crystallized thereby.

A slurry was prepared from 200 g. of the crude crystals and 550 ml. tap water, heated to 85° C., mixed with 10 g. beta-form crystals prepared by the method of the invention, and held at 85° C. for 40 minutes. The slurry was then cooled to room temperature, and the crystals were separated from the mother liquor by filtration and dried in a vacuum.

The purified dry crystals weighed 178 g. (92.03% recovery), had a purity of 99.3%, and a residual coloration of 1.93 which was reduced to 0.13 by carbon treatment. The corresponding values for the crude crystals were 95.2%, 18.5, and 3.6 respectively.

EXAMPLE 8

A supersaturated solution of synthetic DL-glutamic acid, prepared as in Sample D, was seeded with crystals of L-glutamic acid, and 200 g. of the crude L-glutamic acid crystals obtained were dispersed in 300 ml. pure water to form a slurry which was held at 50° C. with agitation for 90 minutes, whereupon the slurry was centrifuged at once. The crystals, which retained 6% moisture, were washed with a small amount of cold water and dried in a vacuum. The dry purified crystals weighed 180 g. and were entirely in the rod-shaped beta form. The purity of the material was improved from 95% to 99.6%.

What is claimed is:

1. A method of removing impurities from crystals of crude L-glutamic acid which comprises:
    (a) contacting said crystals with a liquid medium consisting essentially of water and having a temperature of at least 50° C., the amount of said medium being insufficient to dissolve said crystals, and said L-glutamic acid being stable as a solid phase in contact with said medium,
        (1) at least about 40 percent of said crude crystals being of the rhombic alpha form, said crystals being contacted with said medium until at least 30 percent of the alpha-form crystals originally present are converted to the beta form,
        (2) whereby said crystals are purified and said impurities are dispersed in said medium; and
    (b) separating said purified crystals from the medium and the impurities dispersed therein, said crude glutamic acid crystals having been produced by one of four methods,
        (i) a glutamic acid bearing protein being subjected to hydrolysis by means of a mineral acid in the first of said methods, and said crude crystals being recovered from the hydrolysis mixture,
        (ii) beet sugar wastes being extracted in the second method to recover pyrrolidonecarboxylic acid contained therein, the extracted pyrrolidonecarboxylic acid being hydrolyzed, and said crude crystals being recovered from the hydrolysis mixture;
        (iii) microorganisms being cultured on a medium containing at least a carbon source and nitrogen source in the third method to produce a fermentation broth containing glutamic acid, and said crude crystals being recovered from said broth, and (iv) L-glutamic acid being synthesized in the fourth method by producing DL-glutamic acid by Strecker's or Bucherer hydantoin reaction, and by optically resolving said DL-glutamic acid to L-glutamic acid.

2. A method as set forth in claim 1, wherein said aqueous medium is water, an aqueous solution of a salt of glutamic acid with an alkali metal, ammonium, an alkaline earth metal, or an aqueous solution of an addition product of glutamic acid with a mineral acid.

3. A method as set forth in claim 1, wherein crystals of L-glutamic acid purified by the method of claim 1 are mixed with said crude crystals and said medium during said contacting.

References Cited

UNITED STATES PATENTS

| 3,254,118 | 5/1966 | Hara et al. | 260—534 |
| 3,414,611 | 12/1968 | Noyori et al. | 260—534 |

FOREIGN PATENTS

| 680,233 | 2/1964 | Canada | 260—534 |

OTHER REFERENCES

Kolthoff & Sandell—Quantitative Inorganic Analysis—MacMillan Co., New York, 1947, QD 101 K7, pp. 122–3.

JAMES A. PATTEN, Primary Examiner